Aug. 4, 1964 J. R. HALL 3,143,689

MAGNETIC RECORDING TAPE ERASURE APPARATUS

Filed Aug. 15, 1960 3 Sheets-Sheet 1

INVENTOR.

John R. Hall

INVENTOR.
John R. Hall

Aug. 4, 1964 J. R. HALL 3,143,689

MAGNETIC RECORDING TAPE ERASURE APPARATUS

Filed Aug. 15, 1960 3 Sheets-Sheet 3

INVENTOR.

John R. Hall

United States Patent Office 3,143,689
Patented Aug. 4, 1964

3,143,689

MAGNETIC RECORDING TAPE ERASURE APPARATUS

John R. Hall, 1430 Bella Vista Drive, Dallas 18, Tex.
Filed Aug. 15, 1960, Ser. No. 49,701
10 Claims. (Cl. 317—157.5)

This invention relates to erasure of information previously recorded on a magnetic recording tape and, more particularly, an eraser for bulk tape on reels.

In many instances immediate erasure of information stored on a reel of magnetic recording tape is required. There are also instances when time will not permit manipulation of the recording tape or the erasure apparatus during the erasure process.

It is therefore an object of my invention to quickly and automatically erase information previously recorded on a magnetic recording tape without manipulation of the tape or reels of tape and without manipulation of the erasure apparatus during the erasure process.

A further objective is to provide a tape eraser of the above nature which will function with no moving mechanical parts during the erasure process..

Another objective is to provide a tape eraser which will erase information from magnetic recording tapes in a period of less than five seconds.

A still further objective is to provide a tape eraser of the above nature which incorporates a storage compartment for reels of tape in which the tape may be subjected to erasure without removal from the compartment.

The novel features of my invention are set forth with particularity in the appended claims. However, my invention itself may be best understood by reference to the following specification and accompanying drawings in which:

Figure 1:
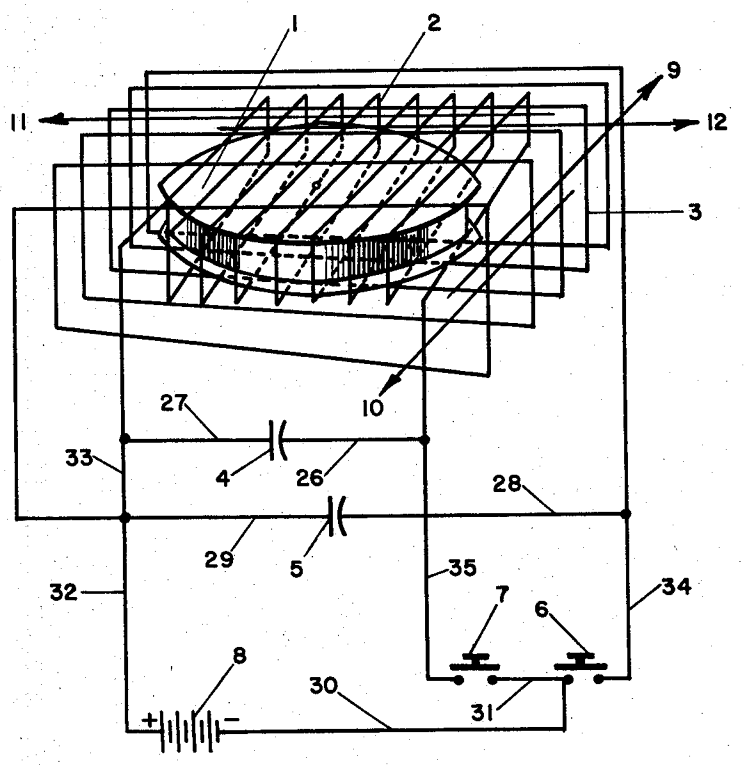
FIGURE 1 is an elementary circuit diagram which serves to illustrate the principles of my invention.

The elementary principles of my invention are best understood by reference to FIGURE 1. The reel or reels of recording tape 1 are placed inside solenoid 2 composed of many turns of insulated copper wire. The reels of recording tape and solenoid 2 are placed inside a second solenoid 3 also composed of many turns of insulated copper wire. When an electrical current is caused to pass through solenoid 2 or solenoid 3, magnetic fields are produced within the cores of the solenoids. Solenoid 3 is oriented so that the lines of force of its magnetic field are in the same plane as those produced by solenoid 2. Solenoid 3 is oriented so that the lines of force of its magnetic field are perpendicular to the lines of force produced by solenoid 2. Solenoid 2 and solenoid 3 are also arranged so that their magnetic lines of force are perpendicular to the axes of the magnetic recording tape reels 1.

A capacitor 4 is connected in parallel with the winding of solenoid 2 by conductors 26 and 27, thereby forming an electrically resonant circuit. Capacitor 5 is connected in parallel with the winding of solenoid 3 by conductors 28 and 29, thereby forming a second electrically resonant circuit.

The battery 8 represents a source of direct current and is connected to momentary contact push-button switches 6 and 7 through conductors 30 and 31; and to capacitors 4 and 5, and solenoids 2 and 3 through conductors 32 and 33.

When switch 6 is momentarily closed, a strong direct current flows from the battery 8 through conductor 30, switch 6, conductor 34, solenoid 3, and conductor 32. This causes a strong magnetic field to be set up around solenoid 3 and magnetic lines of force pass through the reels of magnetic recording tape 1 in the direction of the arrow 9. A degree of longitudinal magnetization of the recording tape 1 occurs for every part of the tape to which these magnetic lines of force approach tangency to the surface of the tape.

When switch 6 opens, solenoid 3 and capacitor 5 cooperate to generate an oscillating electrical current because of the resonant properties previously stated. This oscillating electrical current flows between capacitor 5 and solenoid 3 through conductors 28 and 29. The magnetic lines of force produced by this oscillating electrical current flowing through solenoid 3 therefore alternate in direction, first in the direction of the arrow 9 and then in the direction of the arrow 10. Inherent losses in the electrical circuit cause the amplitude of the oscillating current to diminish with time to zero. Therefore the strength of the alternating magnetic field diminishes with time to zero.

Operation of switch 7 produces magnetic field action about solenoid 2 in the same manner as described for solenoid 3. When the switch 7 is momentarily closed, a strong direct current flows from the battery 8 through conductors 30 and 31, switch 7, conductor 35, solenoid 2, and conductors 33 and 32. This causes a strong magnetic field to be set up around solenoid 2 and magnetic lines of force pass through the reels of magnetic recording tape 1 in the direction of the arrow 11. A degree of longitudinal magnetization of the recording tape 1 occurs for every part of the tape to which these magnetic lines of force approach tangency to the surface of the tape.

When switch 7 opens, solenoid 2 and capacitor 4 cooperate to generate an oscillating electrical current because of the resonant properties previously stated. This oscillating electrical current flows between capacitor 4 and solenoid 2 through conductors 26 and 27. The magnetic lines of force produced by this oscillating electrical current flowing through solenoid 2 therefore alternate in direction, first in the direction of the arrow 11 and then in the direction of the arrow 12. Inherent losses in the electrical circuit cause the amplitude of the oscillating current to diminish with time to zero. The magnetic lines of force produced by current flowing through solenoid 2 orient themselves ninety degrees from those produced by current flowing through solenoid 3.

Portions of the tape that were not subjected to longitudinal magnetization by the action of the magnetic field around solenoid 3 are subjected to magnetization by the action of the magnetic field around solenoid 2. A sufficient number of ampere-turns are provided by the current through the solenoids and the turns of wire comprising the solenoids to assure enough magnetizing action to erase the recorded information from all areas of the tape. The effect of magnetic lines of force alternating in their direction together with a gradual decrease of their strength tends to leave the magnetic recording tape more nearly in a neutral magnetic state.

Figure 2:
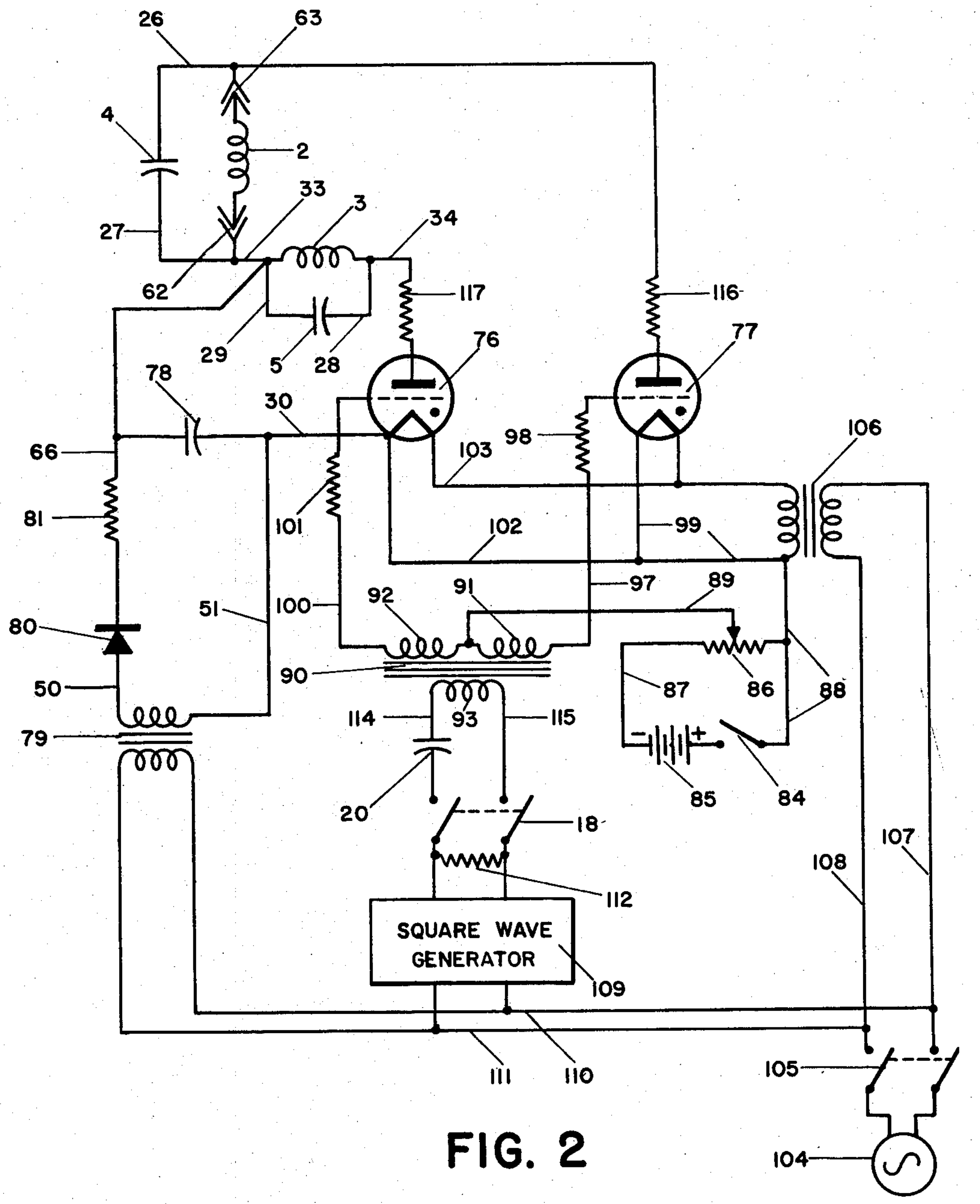
FIGURE 2 is a circuit diagram of one form of my invention.

FIGURE 2 is a circuit diagram of a typical magnetic recording tape eraser based upon the principles described above. Thyratron electron tubes 76 and 77 are used in place of the push buttons 6 and 7 in FIGURE 1. The battery 8 of FIGURE 1 is replaced by an energy storage capacitor 78 which is charged by power provided by the high voltage transformer 79, rectifier 80, and charging resistor 81. Solenoid 2 is a coil of insulated copper wire which is wound around a rectangular box which forms a drawer for holding reels of magnetic recording tape. The solenoid and drawer assembly slides inside solenoid 3. Connectors 62 and 63 are of the banana plug and jack type which permit the connections to solenoid 2 to be disconnected as the drawer is removed from inside solenoid 3. Connectors 62 and 63 automatically reconnect solenoid 2 into the electrical circuit when the drawer is slid into solenoid 3.

Switch 84, when closed applies voltage from battery 85 to potentiometer rheostat 86 through conductors 87 and 88. Battery 15 is connected from its negative terminal to the grid of thyratron tube 77 through conductor 87, potentiometer rheostat 86, conductor 89, secondary winding 91 of transformer 90, conductor 97, and resistor 98. The positive terminal of battery 85 is connected to the cathode of thyratron 77 by way of switch 84, conductors 88 and 99. Similarly, battery 85 is connected to the grid of thyratron tube 76 through conductor 87, potentiometer rheostat 86, conductor 89, secondary winding 92 of transformer 90, conductor 100, and resistor 101. Conductor 102 connects one side of the cathodes of tubes 76 and 77 together. Conductor 103 connects the other sides together.

A source of alternating current power 104 is connected to switch 105 which, when closed, energizes thyratron filament transformer 106 through conductors 107 and 108. Square wave generator 109 is energized through conductors 110 and 111. A high voltage transformer 113 is energized through conductors 110 and 111.

Current flows from the secondary of filament transformer 106 through conductors 99 and 103 to heat the cathodes of thyratron tubes 76 and 77.

Storage capacitor 78 is fully charged by rectified alternating current supplied by high voltage transformer 79 and half wave rectifier 80. The square wave generator 109 produces square waves of voltage at a frequency of one cycle per second. Its output is connected to load resistor 112 and a double-pole, single-throw switch 18. Potentiometer rheostat 86 is adjusted to provide sufficient voltage at the grids of the thyratron tubes 76 and 77 to prevent anode to cathode current conduction. The control grids are maintained at a negative polarity with respect to the cathodes by battery 85.

When switch 18 is closed, a pulse of current from the square wave generator 109 passes through switch 18, isolation capacitor 20 and conductors 114 and 115, and primary winding 93 of pulse transformer 90. This pulse is such that conductor 114 is of positive polarity with respect to conductor 115. The control grid of thyratron switch tube 77 receives a voltage pulse of positive polarity with respect to its cathode over circuitry composed of transformer secondary winding 91 and limiting resistor 98. The pulse of voltage on the grid as described above overrides the fixed voltage provided by the battery 85 making the polarity of the grid positive with respect to the cathode. Thyratron switch tube 77 therefore conducts current between its anode and cathode. The discharge current flows from the energy storage capacitor 78 to charge capacitor 4 and through solenoid 2 by way of limiting resistor 116.

When the charge on capacitor 78 has depleted to a value such that ionization of the gas within the thyratron switch tube 77 ceases, anode to cathode current conduction stops. When this direct current flow stops, an oscillating current flows between solenoid 2 and capacitor 4 through conductors 26 and 27. This occurs because of the electrical resonant properties of a parallel connected solenoid and capacitor. The oscillating current weakens and finally dies out because of inherent losses in the resonant circuit. The strong initial electrical current and the resulting subsequent oscillating electrical current of diminishing amplitude flowing through solenoid 2 produce the erasure effects in the magnetic recording tape as described previously.

During the conduction of thyratron switch tube 77, thyratron switch tube 76 is prevented from conducting by the bias voltage applied to its grid. The pulse from the square wave generator 109 which causes thyratron 77 to conduct also causes a pulse to appear at the grid of thyratron switch tube 76. However, the polarity of this pulse is the same as the bias voltage and does not initiate conduction, i.e.: the grid of thyratron switch tube 76 is driven more negative with respect to its cathode. Thyratron switch tube 76 therefore never conducts current when thyratron switch tube 77 is conducting. Likewise, when thyratron switch tube 76 is conducting, thyratron switch tube 77 does not conduct current.

After thyratron switch tube 77 stops conducting current, the high voltage transformer 79 and rectifier 80 fully recharge the energy storage capacitor 78 through limiting resistor 81.

The square wave generator 109 then delivers a second pulse through switch 18 and capacitor 20 to pulse transformer 21 primary winding. The polarity of the second pulse is opposite the polarity of the first pulse. More particularly, conductor 114 is of negative polarity with respect to conductor 115. The control grid of thyratron switch tube 76 will receive a voltage pulse of positive polarity with respect to its cathode. The pulse of voltage on the grid as described above overrides the fixed voltage provided by battery 85 making the polarity of the grid positive with respect to the cathode. Thyratron switch tube 76 therefore conducts current between its anode and cathode. Discharge current flows from the energy storage capacitor 78 through solenoid 3 by way of limiting resistor 117.

When the charge on capacitor 78 has depleted to a value such that ionization of the gas within the thyratron switch tube 76 ceases, anode to cathode current conduction stops. When the direct current flow stops, an oscillating current flows between solenoid 3 and capacitor 5 through conductors 28 and 29. This occurs because of the electrical resonant properties of a parallel connected solenoid and capacitor. The oscillating current weakens and finally dies out because of inherent losses in the resonant circuit. The strong initial electrical current and the resulting subsequent oscillating electrical current of diminishing amplitude flowing through solenoid 3 produce the erasure effects in the magnetic recording tape as described previously.

The above described alternate pulsing action continues as long as switch 18 is closed. The solenoids 2 and 3 are alternately given pulses of electrical current through thyratron switch tubes 76 and 77. Usually switch 18 is held closed to allow six or seven pulses to occur. This is sufficient for erasure of the magnetic recording tape; the time taken for erasure is well within the desired five-second period.

The size of storage capacitor 78 and the number of turns of insulated copper wire comprising the erasing solenoids 2 and 3 are chosen to assure sufficient ampere-turns for accomplishing the erasure. The sizes of the high voltage transformer 79, rectifier 80, and charging resistor 81 are chosen to fully charge the energy storage capacitor 8 during the inter-pulse period. Grid current limiting resistors 98 and 101 limit the current which flows in the grid circuit to the thyratrons during their conduction periods. Limiting resistors 116 and 117 in the thyratron anode circuits help to limit the anode currents, keeping them within the ratings of the thyratron tubes. In addition, these limiting resistors 116 and 117 are a convenient means for adjusting the initial current flow through solenoids 3 and 2 respectively, thereby providing a means for adjusting the initial strengths of the magnetic fields within solenoids 3 and 2; the two magnetic fields may be adjusted to equal strength values.

Figure 3:
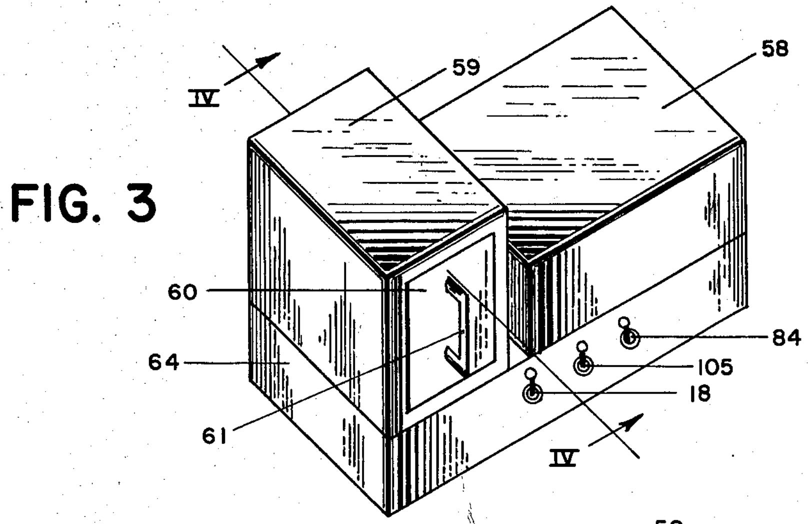
FIGURE 3 is a perspective view of my recording tape erasing apparatus.

The perspective view shown in FIGURE 3 illustrates one form of magnetic recording tape eraser the circuit diagram of which is shown in FIGURE 2. The entire assembly is built on an aluminum chassis 64 which supports the solenoid and capacitor housing 59 as well as all required electrical and electronic components mounted within the protective cover 58. The three operating switches 84, 105, and 18 are mounted in the front section of the foundation chassis 64, and control the grid battery, main power, and square wave pulse, respectively. A recording tape storage drawer 60 can be removed from housing 59 by means of a handle 61.

Figure 4:
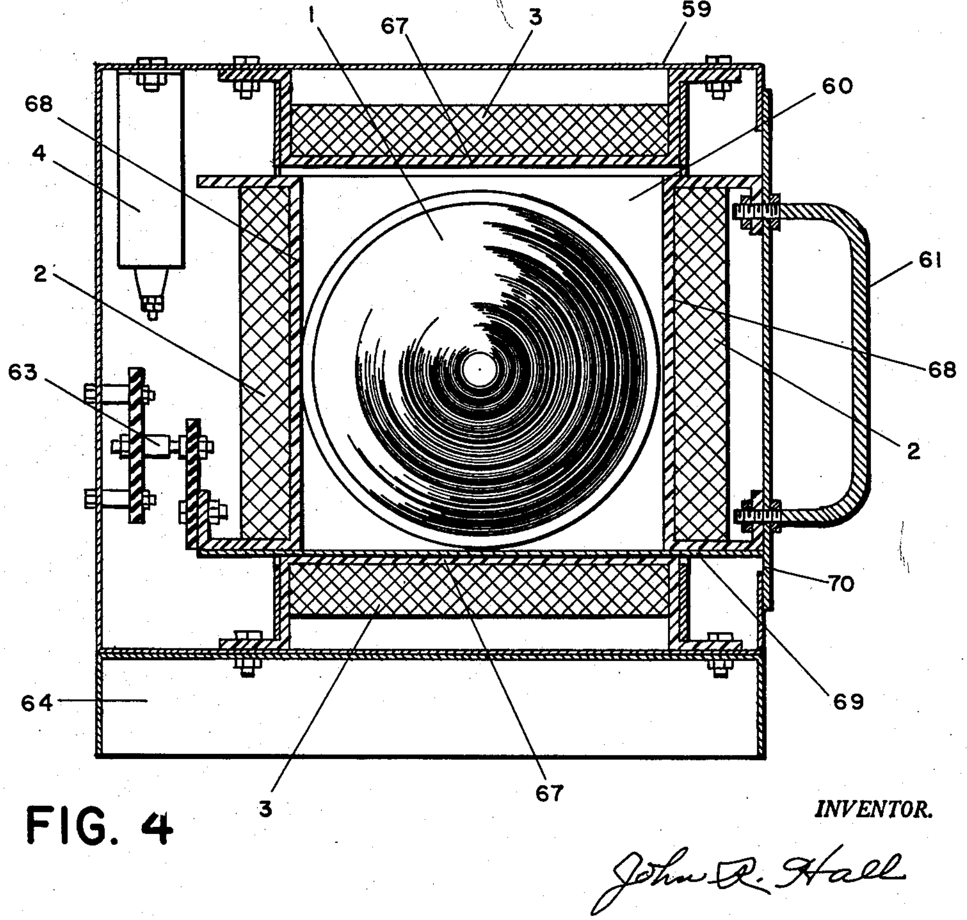
FIGURE 4 is a vertical sectional view through the magnetic recording tape compartment as taken along the line IV—IV of FIGURE 3 and having a reel of magnetic recording tape in position within the compartment ready to be erased.

Construction of the solenoids and the tape storage drawer is shown in FIGURE 4 which is a vertical sectional view through the tape compartment housing 59 as taken along the line IV—IV of FIGURE 3. A reel of magnetic recording tape 1 is shown located in the center of the drawer 60. Solenoid 3 has its turns of insulated copper wire wound on a hard plastic hollow rectangular bobbin 67 which is fixed to the inside of the housing 59. The rectangular hole in bobbin 67 is just large enough to accept solenoid 2 wound on a similar hard plastic hollow rectangular bobbin 68. The rectangular hole in bobbin 68 may hold a number of reels of magnetic recording tape. These are supported by plastic bottom plate 69. Solenoid 2 wound on its bobbin 68, bottom plate 69, front plate 70, and handle 61 comprise the magnetic recording tape storage drawer 60 which may easily be removed to insert or remove reels of magnetic recording tape. A banana plug and jack assembly 63 provides for electrical connections to solenoid 2. Capacitor 4 is the resonant circuit capacitor connected with solenoid 2.

While the description of this invention concerns the erasure of longitudinally recorded magnetic tapes, it is conceivable that with slight modifications it would be able to erase magnetic tapes or wires perpendicularly or transversely recorded. Also, while the description of this invention utilizes thyratron type electron tubes for switching the high electrical currents to the erasing solenoids, it is to be understood that other types of electron tubes or solid state devices such as controlled silicon rectifiers or transistors might conceivably be used for this purpose. Likewise, insulated aluminum wire might be used for the solenoid windings, and the battery 8 might be replaced by a rectifier twpe power supply.

Although certain specific embodiments of my invention are shown and described, modifications thereof are possible. The invention, therefore, is not to be restricted except insofar as is necessitated by the prior art and by the spirit of the appended claims.

I claim as my invention:

1. An eraser for magnetic tape on a reel which comprises:
   (*a*) a first hollow core solenoid of rectangular configuration to receive said reel therein with the axis of said reel perpendicular to the axis of said solenoid,
   (*b*) a second hollow core solenoid of configuration to receive said first solenoid and said reel therein with the axes of said reel and of said first solenoid mutually perpendicular to the axis of said second solenoid,
   (*c*) a unidirectional voltage source,
   (*d*) normally open switch means for connecting said source to said solenoids,
   (*e*) control means for periodically closing and opening said switch means to initiate and to terminate flow of current through said solenoids for storage of energy therein, and
   (*f*) capacitor means connected to said solenoids for producing sustained oscillatory currents in said solenoids of amplitude decreasing with time in dependence upon the losses in said solenoids, said reel and said capacitor means during the interval following each closure and opening of said switch means.

2. The combination set forth in claim 1 in which said solenoids are mounted in a frame with said first solenoid forming a removable drawer having disconnect plug means operative when said drawer is inserted into said frame to complete the circuit from said first of said solenoids to said capacitor means.

3. An eraser for magnetic tape stored on a reel which comprises:
   (*a*) a pair of L-C circuits, each of which includes a hollow solenoid,
      a first of said solenoids forming a receptacle to receive said tape therein with the axis thereof perpendicular to the axis of said first of said solenoids,
      the second of said solenoids forming a receptacle to receive the first of said solenoids therein with the axes of said first of said solenoids and said tape mutually perpendicular and perpendicular to the axis of said second of said solenoids, and
   (*b*) circuit means for periodically introducing electrical energy into said L-C circuits to establish varying magnetic fields which decay to zero in time dependent upon the losses in said circuits.

4. The combination set forth in claim 3 in which said circuit means includes a control means for alternately exciting said circuits.

5. The combination set forth in claim 3 in which said circuit means includes a timing control means for alternately exciting said circuits a plurality of times over an interval of the order of five seconds.

6. An eraser for magnetic tape stored on reels which comprises:
   (*a*) a pair of L-C circuits, each of which includes a hollow air-wound solenoid,
      a first of said solenoids forming a receptacle to receive reels of tape therein with the reel axes perpendicular to the axis of said first of said solenoids,
      the second of said solenoids forming a receptacle to receive the first of said solenoids therein with the axes of said first of said solenoids and said reels mutually perpendicular and perpendicular to the axis of said second of said solenoids, and
   (*b*) means for periodically and alternately establishing ing decaying oscillatory currents in said L-C circuits for production of varying magnetic fields which decay to zero in time dependent upon the losses in said circuits.

7. An eraser for magnetic tape stored on a reel which comprises:
   (*a*) a pair of L-C circuits, each of which includes a first hollow solenoid with said first solenoid forming a receptacle for said reel and a second solenoid forming a receptacle for said first solenoid containing said reel with the axes of said reel and the first and second solenoids mutually perpendicular,
   (*b*) a storage condenser and a charging circuit therefor,
   (*c*) a circuit including normally open switch means for connecting said storage condenser to said L-C circuits, and
   (*d*) control means for periodically closing and opening said switch means to establish oscillatory magnetic fields in said solenoids which fields decay to zero a plurality of times within a demagnetizing interval.

8. An eraser for magnetic tape stored on a reel which comprises:
   (*a*) a pair of L-C circuits, each of which includes a first hollow solenoid with said first solenoid forming a receptacle for said reel and a second solenoid forming a receptacle for said first solenoid containing said reel with the axes of said reel and the first and second solenoids mutually perpendicular,
   (*b*) a storage condenser and a charging circuit therefor,
   (*c*) a circuit including normally open switch means for connecting said storage condenser to said L-C circuits, and (d) control means including a square wave generator for periodically closing said switch means to discharge said condenser and establish oscillatory magnetic fields in said solenoids which fields decay to zero a plurality of times within a demagnetizing interval.

9. An eraser for magnetic tape stored on a reel which comprises:

(a) a first hollow solenoid adapted to receive said reel, (b) a second hollow solenoid to receive said first solenoid therein with the axes of the solenoids and of the reel mutually perpendicular, (c) a first condenser and a pair of movable contacts for connecting said first condenser in parallel to said first solenoid while permitting disconnection of said first solenoid upon removal of said first solenoid from said second solenoid, (d) a second condenser connected in parallel with said second solenoid, (e) a current source, (f) circuit means connecting one terminal of said current source to one terminal of each of said first and second condensers, (g) a first normally nonconductive switch means connecting the other terminal of said current source to the other terminal of the first of said condensers, (h) a second normally nonconductive switch means for connecting said other terminal of said current source to the other terminal of said second of said condensers, and (i) control means for alternately energizing the switch means to cause them to conduct current alternately, said control means including means for producing initiating pulses to initiate current flow from said source and alternately establish decaying alternating magnetic fields in said first solenoid and in said second solenoid to demagnetize said tape.

10. An eraser for magnetic tape stored on a reel which comprises:

(a) a first hollow solenoid adapted to receive said reel, (b) a second hollow solenoid to receive said first solenoid therein with the axes of the solenoids and of the reel mutually perpendicular, (c) a first condenser and a pair of movable contacts for connecting said first condenser in parallel to said first solenoid while permitting disconnection of said first solenoid upon removal of said first solenoid from said second solenoid, (d) a second condenser connected in parallel with said second solenoid, (e) a storage condenser, (f) a charging circuit including means for completing connection to an energy source for charging said storage condenser, (g) circuit means connecting one terminal of said storage condenser to one terminal of each of said first and second condensers, (h) a first normally nonconductive thyratron-type device connecting the other terminal of said storage condenser to the other terminal of the first of said condensers, (i) a second normally nonconductive thyratron-type device for connecting said other terminal of said storage condenser to the other terminal of said second of said condensers, and (j) control means for alternately energizing the thyratron-type devices to cause them to conduct current alternately, said control means including means for producing initiating pulses to discharge said storage condenser alternately through said devices to establish decaying alternating magnetic fields in said first solenoid and in said second solenoid to demagnetize said tape.

References Cited in the file of this patent

UNITED STATES PATENTS

| | | |
|---|---|---|
| 2,154,399 | Davis | Apr. 11, 1939 |
| 2,481,392 | Camras | Sept. 6, 1942 |
| 2,826,642 | Lyon et al. | Mar. 11, 1958 |
| 2,898,408 | Folse | Aug. 4, 1959 |
| 2,930,944 | Yonkers | Mar. 29, 1960 |
| 2,946,932 | Littwin | July 26, 1960 |
| 2,962,560 | Folse | Nov. 29, 1960 |

FOREIGN PATENTS

| | | |
|---|---|---|
| 667,011 | Great Britain | Feb. 20, 1952 |